(12) United States Patent
Mando et al.

(10) Patent No.: US 9,826,367 B2
(45) Date of Patent: Nov. 21, 2017

(54) WIRELESS ROTATING INSTRUMENTATION SYSTEM AND METHODS FOR DATA COLLECTION ON HELICOPTER ROTOR SYSTEMS

(71) Applicant: United States of America as represented by the Secretary of the Army, Washington, DC (US)

(72) Inventors: Michael A. Mando, Madison, AL (US); Tiffany S. Yates, Madison, AL (US); Ryan Chandler, Ardmore, AL (US); Jeffrey Welch, Guyton, GA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 12 days.

(21) Appl. No.: 14/988,532

(22) Filed: Jan. 5, 2016

(65) Prior Publication Data
US 2016/0200452 A1 Jul. 14, 2016

Related U.S. Application Data

(60) Provisional application No. 62/102,193, filed on Jan. 12, 2015.

(51) Int. Cl.
*B64D 47/00* (2006.01)
*H04W 4/02* (2009.01)
*B64C 27/04* (2006.01)
*B64C 27/00* (2006.01)

(52) U.S. Cl.
CPC .......... *H04W 4/028* (2013.01); *B64C 27/008* (2013.01); *B64C 27/04* (2013.01)

(58) Field of Classification Search
None
See application file for complete search history.

(56) References Cited

U.S. PATENT DOCUMENTS 6,564,146 B1 * 5/2003 Meyer .................. G01S 5/0027
244/3.14

OTHER PUBLICATIONS

Michael A. Mando, "1998 Project Wiring Block Diagram" (Figure 1). Aug. 19, 1998.
Michael A. Mando, "Nov. 2009 Wireless Rotating Instrumentation Concept" (Figure 2), Nov. 2009.

* cited by examiner

*Primary Examiner* — Mussa Shaawat
*Assistant Examiner* — Kyung Kim
(74) *Attorney, Agent, or Firm* — William B. Haymond

(57) ABSTRACT

The application relates to a wireless rotating instrumentation package for collecting data from a spinning rotor head of a rotary wing aircraft. The application also relates to a method of wirelessly collecting data from a spinning rotor head of a rotary wing aircraft.

19 Claims, 5 Drawing Sheets

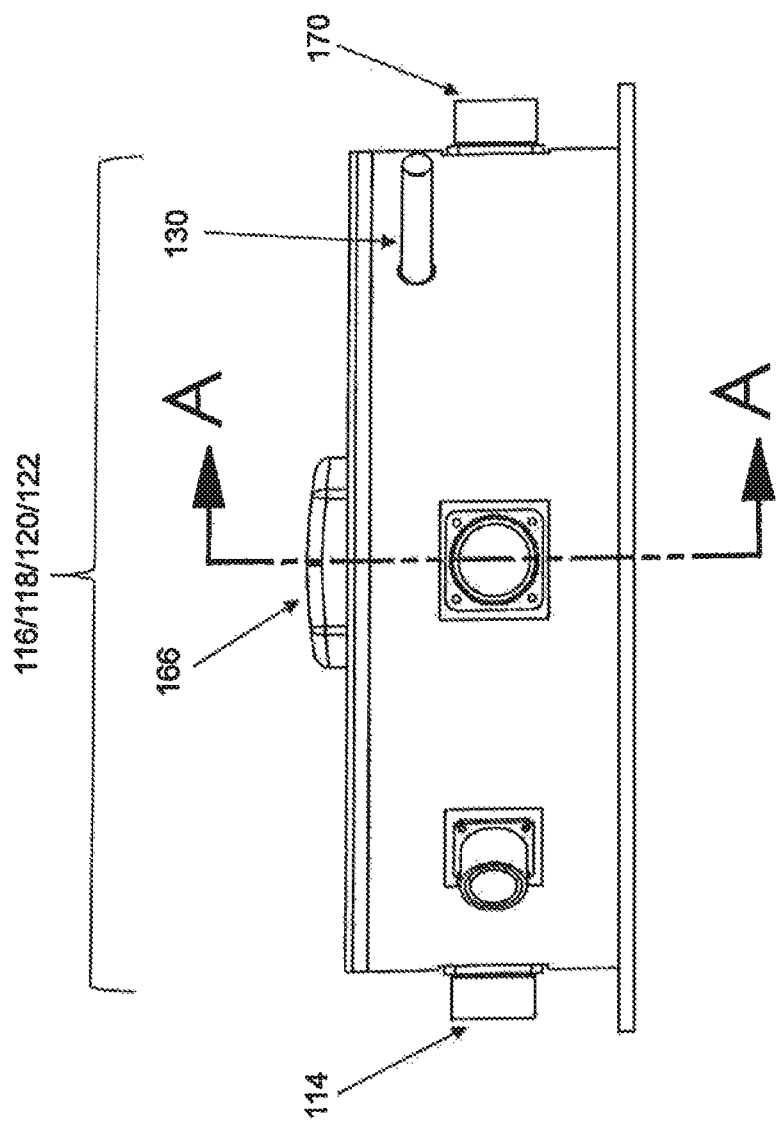

WIRELESS ROTATING INSTRUMENTATION SYSTEM AND METHODS FOR DATA COLLECTION ON HELICOPTER ROTOR SYSTEMS

This application claims the benefit of U.S. Provisional Application No. 62/102,193, filed Jan. 12, 2015.

BACKGROUND

Historically, airframe manufacturers have instrumented helicopter main rotor head(s) to perform flight testing. Typically they have employed data collection systems that require slip ring assemblies to be attached to the main rotor shafts to transfer power up to the instrumentation package and pass data down.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 5 shows a close-up view of an embodiment of the Instrumentation Core Package of a Wireless Rotating Instrumentation Package (WRIP) attached to a helicopter with one rotor and a tail.

DETAILED DESCRIPTION

The Army has funded and participated in projects to develop and test the technologies necessary to realize a wireless system concept that could be used on any type of helicopter. "Wireless" in this case refers to the lack of slip-rings or contacts or wires to pass power or electrical signals to and from the rotating assembly.

The present application realizes a workable solution for collecting data from an aircraft rotor head that is spinning. The concept uses a battery or self-powered instrumentation package on the rotor head of a rotary wing aircraft for the purpose of collecting data for post flight processing in addition to making the data available for real-time monitoring on the ground during flight testing. Embodiments were fabricated and employed for an actual successful flight test program.

Such collected rotor data need to be available after the flight for detailed computer aided data analysis. The rotor data saved for post flight processing must be lossless and time correlatable to the data collected elsewhere on the test aircraft. During the flight test, rotor data should be available real-time for analysis in a ground station in order to maintain safety-of-flight and to make flight test decisions.

The data used for real-time analysis is usable with delays and time uncertainties on the order of a small fraction of a second. It does not need to be lossless but instead it needs to be good enough to use to make flight test decisions.

Figure 1:
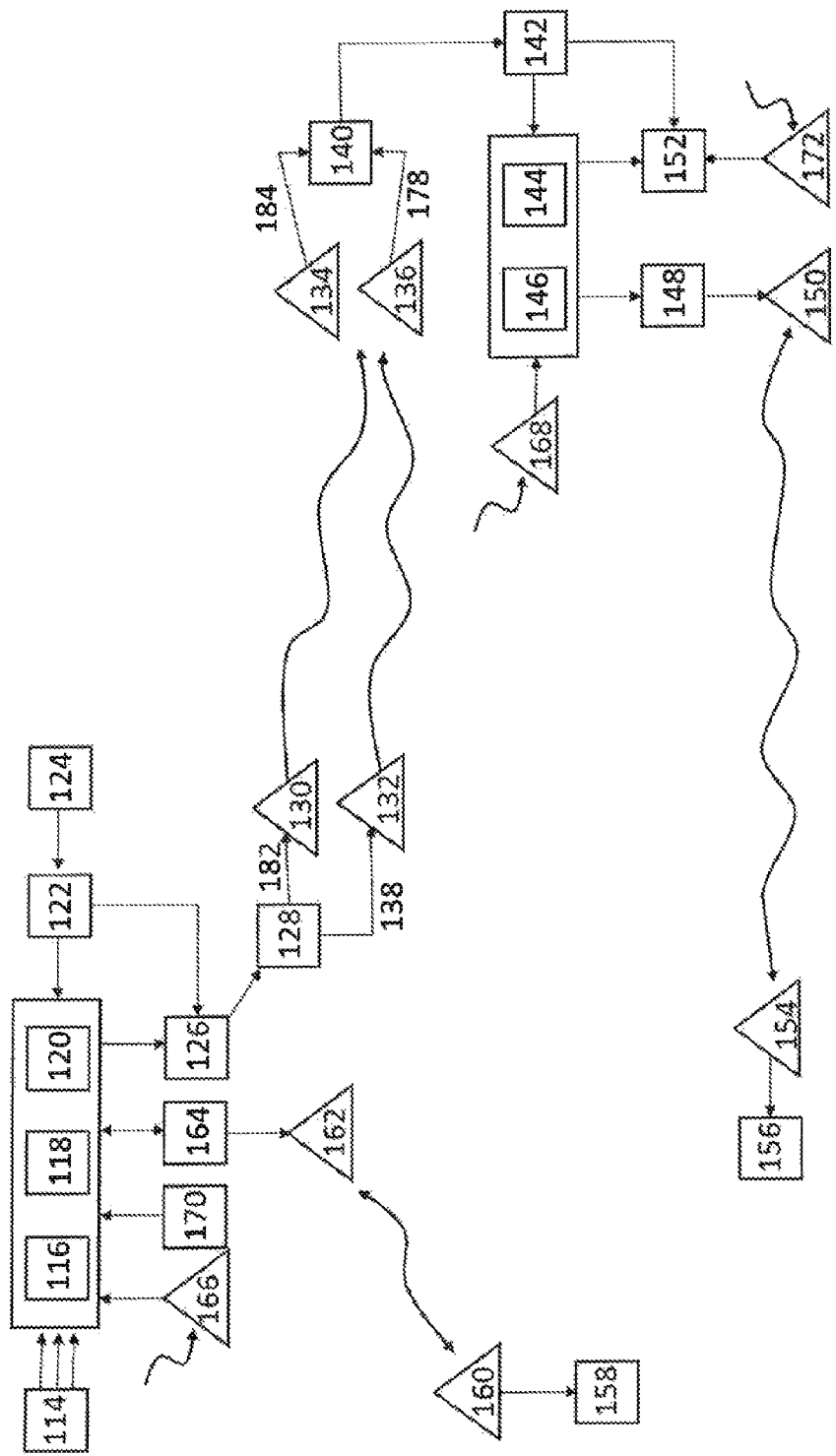
FIG. 1 is a schematic showing an arrangement of components of an embodiment of a Wireless Rotating Instrumentation Package (WRIP).

A low technical risk approach was taken by selecting commercially available components from various vendors and configuring them in a manner to make a useful instrumentation package. See FIG. 1, which is a Wireless Rotating Instrumentation Package (WRIP) shown as a Methods Block Diagram. Also see FIGS. 2 and 3, which are two different embodiments of a WRIP attached to two types of helicopters. The rotating components are contained in a suitable instrumentation package 116/118/120/122 attached to the rotor head 110. Wiring extends from the instrumentation package 116/118/120/122 to the transducers 114 on the rotor head 110 and the rotor blades 112 to collect the data from transducers 114 on the main rotor head 110. The transducers 114 are wired to data modules 116, which in turn are connected to miniature, configurable small data collection system 118. GPS signals are received for the instrumentation package 116/118/120/122 with a data modules GPS antenna 166. A GPS receiver card (not pictured) in the data system provides time tags for the data collection. The Pulse Coded Modulation (PCM)/Frequency Modulated (FM) output of this system feeds a digital L-Band telemetry transmitter 126 using PCM/FM modulation. The rotating small data collection system 118 is attached to an instrumentation package solid state data recorder 120 with removable solid state media (not pictured) for collecting lossless data with microsecond Global Positioning System (GPS) derived time tags received with the data modules GPS antenna 166. The instrumentation package 116/118/120/122 is powered with re-chargeable battery packs 122. The rotor instrumentation package 116/118/120/122 or combination of the data modules 116, the small data collection system 118, the instrumentation package solid state data recorder 120 and the rechargeable battery packs 122 are often attached together to form what is hereinafter referred to as the instrumentation package 116/118/120/122. In one embodiment, the instrumentation package 116/118/120/122 is cylindrically shaped, sitting atop a helicopter rotor head 110 with the axis of the cylindrical style instrumentation package 116/118/120/122 being collinear with the axis (A) of the rotor shaft 180. Built In Test (BIT) 170 features for monitoring battery voltage, temperature and package vibration are connected to the instrumentation package 116/118/120/122. The instrumentation package 116/118/120/122 may optionally be designed with power scavenging features 124 from the rotor head 110. A first telemetry transmitter transmit antenna 130 and optionally a second telemetry transmitter transmit antenna 132 or more are placed on the rotor head 110. If multiple transmit antennas are used, then, for example, the first telemetry transmitter transmit antenna 130, the second telemetry transmitter transmit antenna 132 and so forth are connected to a transmission signal splitter 128, which splits the signal between the multiple telemetry transmitter transmit antennas 130,132.

A telemetry receiver receive antenna 134 and optionally a second telemetry receiver receive antenna 136 or more are placed in "line of site" (LOS) with the first and second telemetry transmitter transmit antenna(s) 130,132 or more. The RF signal from the telemetry receiver receive antennas 134,136 is fed to an airborne telemetry receiver 142 with bit synchronizer (not shown). The Data and Clock from the telemetry receiver 142 with bit synchronizer (not shown) are fed to a decommutator card (not shown) in the data merger 144 attached to the aircraft data collection system 146. The decommutated data is thus directed to the main aircraft data collection system 146 and merged into specific data locations in the PCM data stream using a current value table (CVT) technique for the asynchronous data. This combined composite data is recorded with a GPS time stamp in an aircraft data collection system solid state recorder 152 for post flight data processing of the mainstream parameters. The aircraft data collection system solid state recorder 152 is in turn connected by wire to a collection system solid state recorder GPS antenna 172 which receives GPS signals and sends them to the aircraft data collection system solid state recorder 152. The composite data stream from the aircraft data collection system 146 is directed to an aircraft data collection system telemetry transmitter 148, and tele-metered, using an aircraft data collection system transmit antenna 150 to transmit data to the ground station tracking antenna 154 attached to a ground station 156 for real-time display in the ground station 156. A bi-directional data link, including a maintenance computer 158, and a maintenance computer antenna 160, sends and receives signals via a maintenance link transmit antenna 162 which is connected to a ground maintenance-providing bi-directional RF data link 164 which in turn is connected to the small data collection system 118 in the rotor instrumentation package 116/118/120/122. Thus by means of the maintenance computer 158, using readily available data link technologies, a system can be implemented to allow easy access to the rotor instrumentation package 116/118/120/122 data system for programming, pre-flight checkout and maintenance functions on the ground. The combination of the airborne telemetry receiver 142, data merger 144, aircraft data collection system 146, aircraft data collection system telemetry transmitter 148 and aircraft data collection system solid state data recorder 152 is often attached together to form what is hereinafter referred to as a receiver package 142/144/146/148/152.

Antenna Link Methodology: Problems and Solutions

Figure 2:
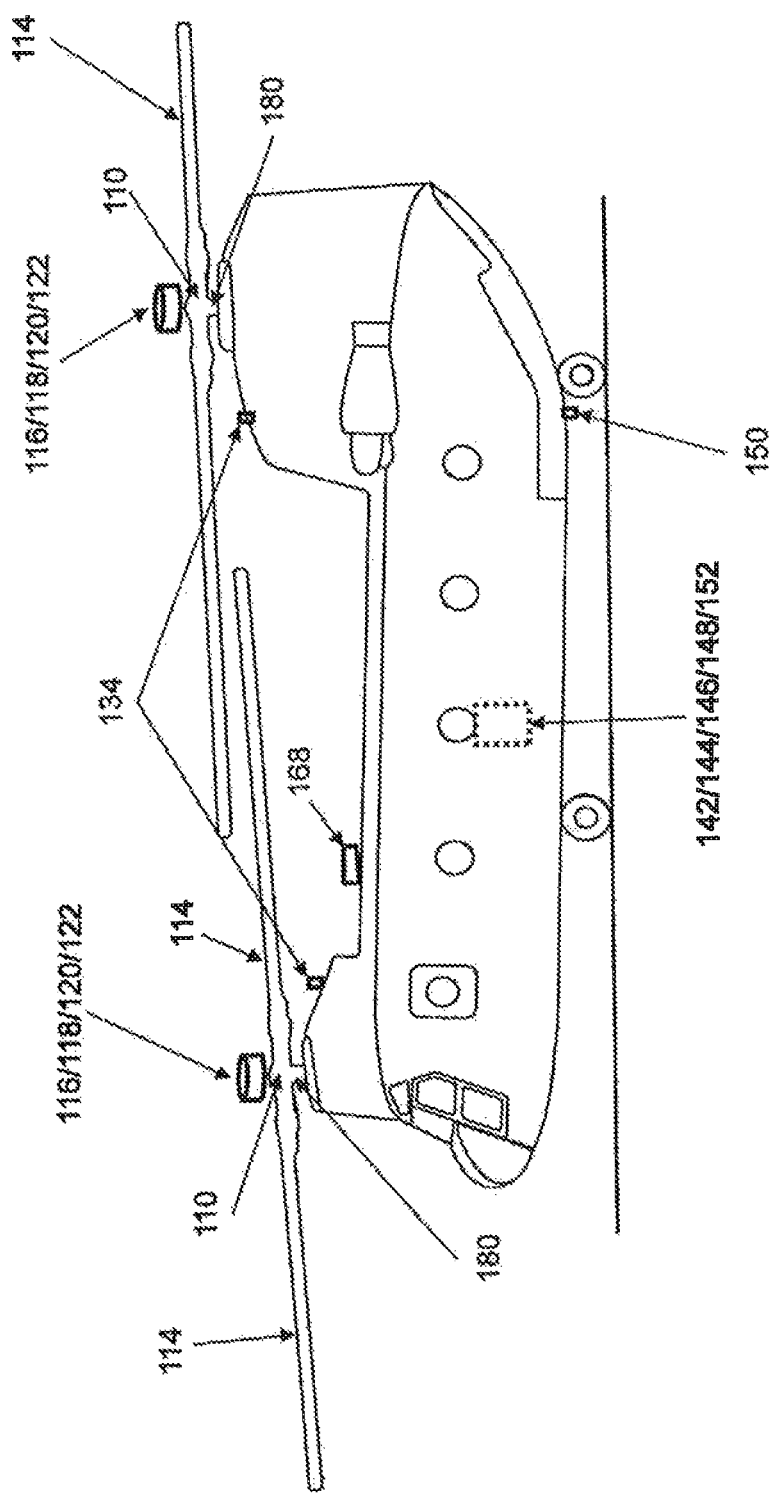
FIG. 2 shows a view of an embodiment of a Wireless Rotating Instrumentation Package (WRIP) attached to a helicopter with two rotors and no tail.
Figure 3:
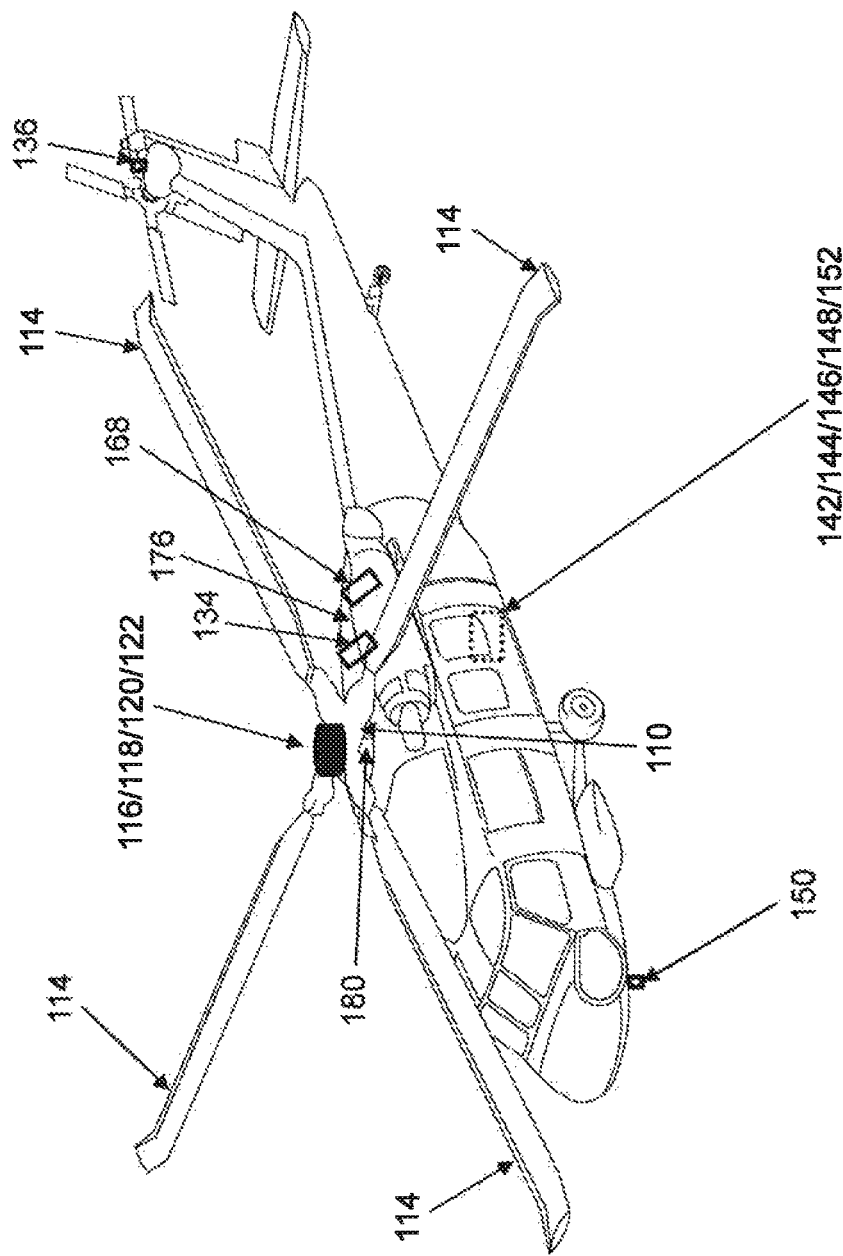
FIG. 3 shows a view of an embodiment of a Wireless Rotating Instrumentation Package (WRIP) attached to a helicopter with one rotor and a tail.

Antenna Geometry: The Airborne test telemetry bands include microwave radio frequencies that are directional and require line-of-sight (LOS) between the first and second telemetry transmitter transmit antennas 130, 132 and the first and second telemetry receiver receive antennas 134, 136 to establish adequate communications. If the configuration of the antennas is such that a LOS condition can be accommodated, then an adequate link can be established relatively easily. Such is the case with a non-limiting example of a first telemetry transmitter transmit antenna 130 placed on the top of the rotor head 110 and a first telemetry receiver receive antenna 134 placed on a cowling/cover 176 behind and below the rotor head 110, as well as a second telemetry receiver receive antenna 136 placed high on the tail of a UH-60 helicopter with a tail rotor 110, as shown in FIG. 3. In contrast, as shown in FIG. 2, in a non-limiting example, with a non-LOS arrangement on a CH-47 helicopter, with two main rotors and no tail, it is not possible to set up this configuration. There is an instrumentation package 116/118/120/122 atop each rotor shaft 180. The RF link must be made under the rotor system. If a first telemetry transmitter transmit antenna 130 is placed on the bottom of the rotor system and a first telemetry receiver receive antenna 134 is placed on the roof of the cabin under the rotor 110, then as the first telemetry transmitter transmit antenna 130 rotates, a situation will occur where the main rotor head 110 and/or shaft 180 will block the signal and result in an unacceptable loss of data. The solution to this problem is a second telemetry transmitter transmit antenna 132 and/or a second telemetry receiver receive antenna 136 to maintain a line of sight through the full rotation. The signal can thus be transmitted. In this embodiment, the receiver package 142/144/146/148/152 is located within the helicopter cab.

Alternatively, as shown in FIG. 3, in a non-limiting example, with a non-LOS arrangement, there is shown a UH-60 helicopter, with one rotor and a tail. There is an instrumentation package 116/118/120/122 attached atop the rotor 110. The telemetry receiver receive antenna 134, as well as the GPS antenna 168, is placed on the engine cowling/cover 176, below and behind the rotor head 110. The aircraft data collection system transmit antenna 150 is placed below the front end of the helicopter. There is a receiver package 142/144/146/148/152 within the helicopter cab.

Figure 4:
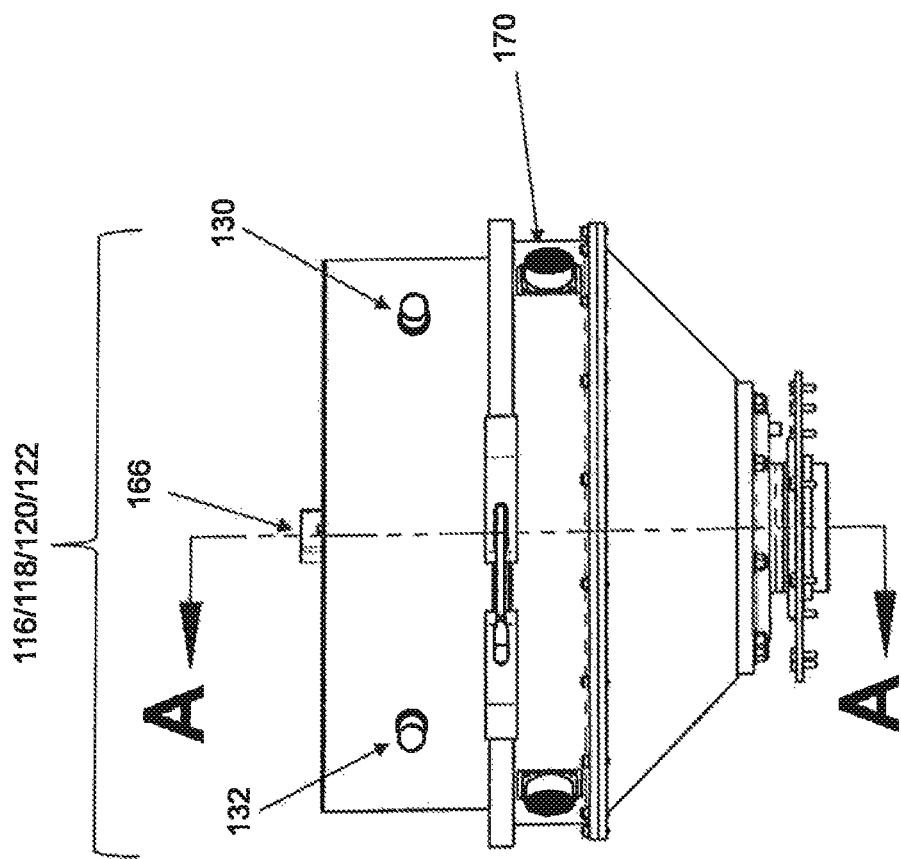
FIG. 4 shows a close-up view of an embodiment of the Instrumentation Core Package of a Wireless Rotating Instrumentation Package (WRIP) attached to a helicopter with two rotors and no tail.

FIG. 4 shows a close-up view of one of the two cylindrical/conical instrumentation core packages 116/118/120/122 shown in FIG. 2. These are the instrumentation core packages 116/118/120/122 that are perched on top of the two helicopter rotor heads 110 shown in FIG. 2. FIG. 2 shows the helicopter rotor blades 112 and rotor shaft 180 surrounding the instrumentation core packages 116/118/120/122. The axis of the rotor shafts 180 are collinear with the axis (A) of the instrumentation core packages 116/118/120/122. In FIG. 4, on the instrumentation package 116/118/120/122 is shown the two telemetry transmitter transmit antennas 130/132. Also shown are views of the data modules GPS antenna 166 and the BIT 170.

FIG. 5 is a close-up view of the cylindrical instrumentation core package 116/118/120/122 shown in FIG. 3. In FIG. 5 are shown views of a first telemetry transmitter transmit antenna 130, data modules GPS antenna 166, BIT 170 as well as a rotor data transducer 114. FIG. 3 shows the helicopter rotor blades 112 and rotor shaft 180 surrounding the instrumentation core package 116/118/120/122. The axis of the rotor shaft 180 is collinear with the axis (A) of the instrumentation core package 116/118/120/122 shown in FIG. 5.

Signal Combination: An RF transmission signal splitter 128 (for telemetry transmitter transmit antennas 130,132) and/or receiver signal combiner 140 (for telemetry receiver receive antennas 134,136) is used between the two types of antennas. The classical problem with multiple antennas is the cancellation of the composite signal when the two signals combined are equal amplitude and 180 degrees out of phase. One can change the phase and amplitude of the signals independently using hardware. The phase can also be changed by varying the length of the cables, whether they be transmit cables 138,182 or receive cables 178,184. The transmit cables 138,182 are connected to the two telemetry transmitter transmit antennas 130,132 and the receive cables 178,184 are connected to the two telemetry receiver receive antennas 134, 136. The length of microwaves in a co-axial cable are on the order of a few inches, so varying the length an inch can avoid cancellation at a given rotor position. The relative amplitudes of the signals can be varied using, respectively, an RF transmission signal splitter 128 and/or RF receiver signal combiner 140 with the appropriate frequency range. These devices are currently available in a number of different ratios, for example; 50%-50%, 60%40% and 90%-10%.

Variable Power: A feature of this method is that the power of the transmitter is variable (from approximately 10 milli-Watts to approximately 10 Watts). RF link performance is a function of power available. Performance increases are not linear with increased power. A point of diminishing return can be found experimentally during ground runs. The links in this application are short and it was found that adequate performance could be realized using 10 s of milli-watts in an embodiment with an under-the-rotor antenna configuration. It was shown during the early experiments, that power on the order of 100 milli-watts would be sufficient to produce a link to a telemetry transmitter transmit antenna(s) 130,132 and back to the main aircraft data collection system 146 via a telemetry receiver receive antenna(s) 134, 136 and an RF receive cable(s) 178,184. One implementation of this used a commercially available, powered, low noise microwave amplifier (LNA) (not pictured) at the tail of the helicopter to drive the return signal RF receive cable 178,184, thus lowering the power requirements at the WRIP data collection system telemetry transmitter 128.

Antenna Polarization: A variable of the RF link is the polarization of the telemetry transmitter transmit antenna(s) 130,132 and the telemetry receiver receive antenna(s) 134, 136. The polarization of an antenna is fixed in the manufacturing process. Some of the variations are: Horizontal, Vertical or Circular polarization with Left or Right Hand options. Polarization of the telemetry transmitter transmit antenna(s) 130,132 and the telemetry receiver receive antenna(s) 134,136 should match the signal in order to obtain the greatest efficiency. The mounting orientation of the telemetry transmitter transmit antenna(s) 130,132 and the telemetry receiver receive antenna(s) 134,136 affects the polarization of the links. This is a complex three dimensional problem in a system that is continually changing its geometry cyclically. If bounces off of stationary and rotating components of the aircraft are included, the problem becomes very difficult to visualize. The complex geometries that constantly change during rotation also make the results very difficult to model and predict a solution. On the other hand, these messy situations also make it less likely that the perfect cancellation will occur. Limited 3-D modeling and experience has shown that experimenting with the variables outlined here will result in an "adequate" solution.

What is "Adequate" Real-Time Performance?

A measure of digital data link performance is Bit Error Rate (BER). The links described here can easily achieve BER in the 10E-6 range. In simplistic terms this means 1 error every 1 million bits. In the case of one embodiment, experimentation was stopped when the error rate was about 1 data error in 10 seconds. It should be noted as part of the method, that the decommutation synchronization strategy of the short link telemetry on the aircraft should be set very "loose". This means that individual bit errors in a frame synchronization pattern will tend NOT to drop out a whole frame of data. Individual bit errors in least significant bits will not be noticeable. Bit errors in higher order bits will be easily recognized visually as errors, because the next sample will return to the correct value. If desired, wild-point routines or filtering of the data may be implemented real-time to reduce the effects of these dropout errors. A goal here would be to make it possible to automate real-time computer monitoring of data limits. As a practical matter the short RF ink has a fraction of the dropouts associated with the normal main ground link.

The following is an outline of the process to establish an adequate telemetry link:

1. Overhead Link: If geometry allows, as in the case of a conventional helicopter with a vertical tail rotor, a line of site (LOS) link is established using a single omni-directional telemetry transmitter transmit antenna 130 and a telemetry receiver receive antenna 134. The telemetry receiver receive antenna 134 should be high on the tail to avoid or minimize rotor blade interference. Polarization should nominally be matched. A directional telemetry receiver receive antenna 134 on the tail such as a horn or slot array is advantageous to the link but may not be aerodynamically acceptable for certain flight tests. To test the link, first run the aircraft on the ground, away from large RF reflectors such as metal aircraft hangar buildings. Looking at receiver signal to noise ratios and/or Bit Error Rate (BER) tests during ground runs can help establish the first workable solution. Ultimately, real-time telemetry from the main package will be viewed in the ground station 156. The power and antenna geometry should be varied on successive runs and then iterated to establish an adequate link.

2. Under Rotor Link: A telemetry link can be established under the rotor head 110. When trying to use a single telemetry transmitter transmit antenna 130 and telemetry receiver receive antenna 134, LOS will usually be compromised by the rotor head 110 or shaft 180. The solution is to use either two telemetry receiver receive antennas 134, 136 and/or two telemetry transmitter transmit antennas 130, 132, approximately placed 180 degrees around the rotor shaft 180. Because of the difficulty of predicting the link performance, a physically convenient mounting scheme should be chosen that gives LOS to at least one pair of antennas at every rotor position. Experimentation on the first embodiment involved about a dozen ground runs and a few short flights. The variables in the problem, their effect and desired end state are summarized:

a. Various number and locations of telemetry transmitter transmit antennas 130, 132 and/or telemetry receiver receive antennas 134, 136 may be tried to maintain a line-of-site link during rotation of the rotor head 110.

b. Various polarization and orientation of telemetry transmitter transmit antennas 130, 132 and/or telemetry receiver receive antennas 134, 136 may be tried to establish a favorable RF link through the full rotation of the rotor head 110, to resolve a three dimensional visualization problem.

c. Control of RF transmit cable lengths 138,182 to vary the signal phasing at the transmission signal splitter 128 or receiver signal combiner 140 may be tried to control cancellations of the signal as a function of rotation angles.

d. Various ratios of the relative amplitude of the signals in the transmission signal splitter 128 and/or the receiver signal combiner 140 may be tried to control cancellations of the signal as a function of rotation angles.

e. RF transmit power may be varied to get an adequate signal to noise ratio and adequate BER. There is a point of diminishing returns that can be determined experimentally during a ground run.

Using the Methodology outlined herein to manipulate the variables that affect the telemetry link, one can improve an RF link performing real-time monitoring of data on rotors.

Battery Technology:

A defining feature and critical component of the present system is the battery power source 122. The technology chosen, Lithium iron phosphate (LiFePO$_4$), has only been commercially available for a few years. Requirements for use of LiFePO$_4$ in an aircraft application in general and this application in particular included:

A. Intrinsically safe charge and discharge characteristics, no thermal runaway;

B. Ability for fast charge and discharge, characteristic low internal impedance;

C. High energy density, W-hr/unit volume;

D. Rugged construction capable of withstanding the forces on a Rotor head 110;

E. Commercial availability in the Amp-hour capacities and form factors for these applications, 4 to 10 A-hr at 24 Vdc.

The battery capacity can be tailored to the aircraft application. Different aircraft have different flying times available. For helicopter applications this is between 1½ and 4 hours. The power required by the package is the other variable that establishes the size or Ampere-hours required at a certain voltage.

Electrical energy storage batteries 122 in general and LiFePO$_4$ technology in particular can be used to power aircraft rotor package instrumentation.

Global Positioning System (GPS) Time Correlation:

Time Correlation: Time correlation of the data obtained on the rotor head 110 with the data collected elsewhere is critical to the concept. This system methodology uses at least one data modules GPS antenna 166 in the rotating package 116/118/120/122 and at least two independent GPS receivers 168, 172 connected to the airframe package 142/144/146/148/152 to time stamp the recorded data. GPS time stamps in this embodiment were accurate to better than 20 μsec when the GPS signals were locked and collected to the micro-second resolution. Subsequent modifications to these devices yielded accuracies down to one micro-second. Two time formats are available in both packages. The first is time embedded in the PCM data stream or "time as data" (the "main stream" file) and the second is the acquisition time stamp saved in the recorded file (a .bin or RCC-106 Chapter 10 format) of the aircraft data collection system solid state recorder 152. The two data systems are not synchronized. Sample rates and sample times are different in each. The two data sets can be easily plotted on the same time scale. If data analysis routines require that samples be coherent or in the same stream, then further manipulation will be required. A novel method to do this is based on the fact that the main telemetry stream is made to contain rotor data received from the instrumentation package 116/118/120/122, sampled and at times synchronized to the main data stream data. The rotor data actually contained in these time slots is subject to the short telemetry link dropouts and time jitter caused by the Current Value Table (CVT) merging of the asynchronous data from the rotor head 110. To solve this problem requires post-processing of the two recorder data files. First, the exact time of the rotor data needed in the time slot in the main data stream should be found. Second, the two data points in the rotor data that bracket the time required should be found. The data to the exact time needed should be interpolated. A Linear or Spline interpolation may be used here to find the data value between the two data time points. The data value in that time-slot in the main stream file should be replaced. The data may be manipulated in counts in the original Chapter 10 files of the recorded file or after date reduction in engineering units. The PCM "frame positional" time offset of each parameter should be accounted for. Note, if strict time correlation between specific measurements is a requirement, then other delays such as transducer delay and pre-sample filter delays will also have to be accounted for.

Rotating GPS Antenna: Accurate time tagging is essential to the dual stream concept. The data modules GPS antenna 166 on the rotor head 110 can be subject to interference from the digital L-band telemetry transmitter 126 for the telemetry link. A notch filter (not pictured) can be employed on the data modules GPS antenna 166 feed to minimize this effect. On the first embodiment, first and second telemetry transmitter transmit antennas 130, 132 were spaced about a foot from the data modules GPS antenna 166 and the power was small that was necessary to obtain an acceptable link. Thus the problem was avoided. In another embodiment the omnidirectional data modules GPS antenna 166 was mounted in the center of the rotor head 110, so there was no apparent change in antenna location with rotation. A signal available from the GPS receiver card (not shown) that indicates the status of the airborne telemetry receiver 142 is monitored during flight. This indicated that the airborne telemetry receiver 142 rarely lost lock. If it did, it was for a small fraction of a second and the on-board phase-locked clock free-runs through this. A situation may arise where the data modules GPS antenna 166 cannot be placed at the center of rotation or where the rotor structure 110 interferes with line-of-sight to the satellite constellation during rotation. Initial experiments with this situation, with the airborne telemetry receiver 142, indicate that time will stay "locked". This may not hold true for all possible configurations or different vendors' equipment. Possible solutions would include: multiple data modules GPS antennas 166 or a distributed data modules GPS antenna 166, or a change in GPS card programming to allow time data to pass without a GPS location solution.

The GPS receiver antennas 166, 168, 172 and time stamps (not shown) to the micro-second level can be used to accurately time correlate the data as recorded. There are independent data modules GPS antennas/receivers 166 located in the rotating package 116/118/120/122 as well as independent aircraft data collection system GPS antennas/receivers 168 and solid state recorder GPS antennas/receivers 172 located in the main aircraft data package 142/144/146/148/152. Time is embedded in the data stream and the recorded date can be time-stamped in the (Ch 10) file format. If synchronous data from both sources is required in one data stream for post processing, then a specific pre-processing data merging technique, outlined above, may be implemented.

Maintenance Uplink:

As part of the daily operation of this rotor instrumentation, a number of functions may or may not need to be performed that require interaction with the instrumentation package 116/118/120/122:

a. turning the system on or off,
b. exercising the calibration modes,
c. checking the data before flight,
d. re-programming the data system.

In the case of a small aircraft it may be easy to physically reach the rotor instrumentation package 116/118/120/122 to turn it on or off or hook a cable to it. In a larger aircraft such as a CH-47 it is difficult, time consuming and somewhat dangerous for instrumentation personnel to climb up to the rotor head(s) 110 on a regular basis. What is needed is a wireless bi-directional communications link. The requirements for this link are commercially available solutions that can be adapted to provide the necessary functionality. A 900 MHz RS-232 data modem, Blue-tooth or Wi-Fi are but a few technologies that would be satisfactory.

To realize improved maintenance, daily operations and personnel safety of a rotating instrumentation package, a bi-directional data link between a personal computer and the rotating instrumentation package can be implemented using existing technologies such as Bluetooth, Wi-Fi or a 900 MHz data modem.

Alternate Power Sources and Energy Scavenging:

The instrumentation package 116/118/120/122 is powered with a rechargeable battery 122. The size, weight and power of this battery 122 is dependent on the power used by the system and the desired run time. The target in the case of the first embodiment was 3-4 hours. About 3.5 hours was achieved with a 6.6 A-hr battery 122. This is somewhat dependent on the transmit power. The battery 122 must be re-charged or replaced with a charged battery 122 when depleted. The rotor 110 is spinning and being driven with a powerful engine. There is plenty of power available to scavenge and re-charge the battery 122 in flight. Any number of power generation devices should be feasible to generate all or part of the power required to operate the instrumentation package 116/118/120/122. All of the schemes will need a power converter to change the energy produced to a usable form and to charge the battery 122. These converter devices are becoming available commercially for this express purpose to change the energy produced to a usable form. Energy Scavenging Schemes include:

1. Airflow Driven DC generator—A direct current-producing generator can be mounted on the top center of the rotor head 110. Blades 112 or vanes (not shown) or anemometer type cups (not shown) or a combination of both can be mounted to the generator shaft 180. As the rotor 110 turns, aerodynamic forces on the cups and vanes will slow down the shaft 180 with respect to the rotating generator (not shown), allowing energy to be extracted in the form of electricity. Air flow around a rotor 110 is complex and varies in the different flight regimens. In a hover the higher pressure below the rotor 110 bleeds up close to the rotor 110 and will partially succeed in turning properly angled blades 112 attached to a generator in the opposite direction of the rotor 110 producing a speed difference between the spinning generator (not shown) and the blades 112. In forward flight the airflow will tend to be directional, forward to aft. In this regime the anemometer type cups (not shown) will produce drag in the direction opposite the rotor-generator movement. In any case the difference in speed between the generator shaft 180 hooked to aerodynamic devices and the generator (not shown) driven by the rotor head 110 will be exploitable to produce energy.

2. Linear generator driven by rotor component motion— Most helicopters have a lead/lag damper (not shown) for each rotor blade 112. These dampers (not shown) slow down a motion that is not productive to flight. They waste energy in the process. A linear generator (not shown) could be fashioned and mounted in parallel to the damper(s) (not shown) and used to remove electrical energy. The speeds and forces available here are substantial and can easily accommodate adequate energy production using direct drive of a magnet through a coil. An example of a small commercial linear generator is the flashlight that one can shake to put a charge on a battery and produce light. Other cyclical motions such as the pitch change link up and down motion could also be harnessed in this manner using the inertial mass of a magnet. A short throw, inertial mass, linear or angular rotor generator (not shown) could harness the energy in the rotor 110 small motion, high frequency vibration.

3. Other Methods of power scavenging: a) Piezoelectric generation from vibrations; b) Solar power—from solar cells on the top of the rotor package.

Alternate Power Schemes not Considered as Scavenging:

4. Direct Drive DC Generator—Some helicopters have a standpipe (not shown) in the center of the rotor shaft 180 for various reasons. This standpipe (not shown) does not rotate with the rotor head 110. A DC generator (not shown) would be mounted over the top center of this standpipe (not shown). The generator shaft (not shown) would be restrained from spinning by the standpipe (not shown), thus allowing the generator to produce electrical power which could be conditioned to charge a small battery 122 or power the instrumentation directly when the rotor 110 is spinning.

5. Slip ring power—Some helicopters have rotor shaft 110 de-icing slip-rings (not shown) that bring power up to the rotor blades 112 for heating and de-icing. The slip ring assembly (not shown) power could also be used to power the instrumentation package 116/118/120/122.

Energy can be scavenged from the motion naturally occurring on the rotor head 110 to power an instrumentation package 116/118/120/122 or supplement the charge on a battery 122, in order to replace or minimize the size and weight of a battery 122 required to power a rotating instrumentation package 116/118/120/122 during flight test.

The present application relates to a wireless rotating instrumentation package 176 for collecting data from a spinning rotor head 110 of a rotary wing aircraft, the data being used for both real time flight testing and post flight processing, the package comprising:

a) data modules 116;

b) a small data collection system 118 including a GPS time card (not shown) to provide time tags for data collection; and c) an instrumentation package solid state data recorder 120 with removable solid state media (not shown) for collecting lossless data with micro-second GPS derived time tags (not shown);

and wherein wired devices communicate by wire to the instrumentation package 116/118/120/122, the wired devices including:

a) rotor data transducers 114 on the rotor head 110 and rotor blades 112;

b) battery or batteries 122;

c) a data modules GPS antenna 166 enabled to send GPS signals by wire to the data modules 116;

d) a digital L-Band telemetry transmitter 126 using PCM/FM modulation to receive Pulse Coded Modulation (PCM) output from the data collection system 118; and e) at least one telemetry transmitter transmit antenna 130,132, being connected by wire to receive a signal from the digital L-Band telemetry transmitter 126;

and wherein the instrumentation package 116/118/120/122 is enabled to communicate wirelessly with an aircraft data collection system 146, by a wireless signal being sent via the at least one telemetry transmitter transmit antenna 130,132, the aircraft data collection system 146 including:

a) at least one airborne telemetry receiver receive antenna 134,136 being positioned in line of site with the telemetry transmitter transmit antenna(s) 130,132, and being connected by wire to send a signal to the airborne telemetry receiver 142;

b) the airborne telemetry receiver 142 being enabled to be fed the signal received by the at least one airborne telemetry receiver receive antenna 134,136, the airborne telemetry receiver 142 including a bit synchronizer;

c) a decommutator card (not shown) included in a main aircraft data collection system 146, the decommutator card (not shown) being enabled to receive data from the bit synchronizer (not shown) of the airborne telemetry receiver 142, and the decommutator card (not shown) then being enabled to direct decommutated data to the main aircraft data collection system 146;

d) an aircraft data collection system solid state recorder 152 in which combined composite data from the aircraft data collection system 146 is recorded with a GPS time stamp (not shown) for post flight data processing;

e) a solid state recorder GPS antenna 172 connected by wire to the aircraft data collection system solid state recorder 152, to send GPS data from the solid state recorder GPS antenna 172 to the aircraft data collection system solid state recorder 152;

f) an aircraft data collection system telemetry transmitter 148 to which the combined composite data is directed and telemetered;

g) an aircraft data collection system transmit antenna 150 connected by wire with the aircraft data collection system telemetry transmitter 148 by which data can be sent from the aircraft data collection system telemetry transmitter 148 to a ground station tracking antenna 154;

h) an aircraft data collection system GPS antenna 168 connected by wire to the aircraft data collection system 146 and being enabled to receive GPS data for the aircraft data collection system 146;

i) the ground station tracking antenna 154 connected by wire to a ground station 156, the ground station tracking antenna 154 being enabled to receive data from the aircraft data collection system transmit antenna 150 which is in direct communication with the aircraft data collection system telemetry transmitter 148; and j) the ground station 156 which analyzes the data received to maintain safety-of-flight and to make flight test decisions.

In an embodiment of the wireless rotating instrumentation package, when multiple telemetry transmitter transmit antennas 130,132 are used then a transmission signal splitter 128 is connected by wire to the digital L-Band telemetry transmitter 126 and the multiple telemetry transmitter transmit antennas 130, 132 are in turn connected by wire to the transmission signal splitter 128.

In another embodiment of the wireless rotating instrumentation package 116/118/120/122, when multiple airborne telemetry receiver receive antennas 134,136 are used then a receiver signal combiner 140 is connected by wire to the airborne telemetry receiver 142 and the multiple airborne telemetry receiver receive antennas 134,136 are in turn connected by wire to the receiver signal combiner 140.

In yet another embodiment of the wireless rotating instrumentation package 116/118/120/122, the instrumentation package further comprises a power scavenging unit 124 connected to the rotor head 110 and the battery 122, and the power scavenging unit 124 helps power the battery 122.

In still another embodiment of the wireless rotating instrumentation package 116/118/120/122, the small data collection system 118 includes a ground maintenance-providing bi-directional RF data link 164 connected by wire to the small data collection system 118; the ground maintenance-providing bi-directional RF data link 164 including a maintenance link transmit antenna 162; wherein the maintenance link transmit antenna 162 in turn transmits data to the aircraft data collection system GPS antenna 168 which is connected by wire to the aircraft data collection system 146.

In an embodiment of the wireless rotating instrumentation package 116/118/120/122 including the ground maintenance-providing bi-directional RF data link 164, the maintenance link transmit antenna 162 transmits data wirelessly between the ground maintenance-providing bi-directional RF data link 164 and a maintenance computer antenna 160 included on a maintenance computer 158, the maintenance computer 158 in turn controls i) turning the wireless rotating instrumentation package 116/118/120/122 on or off; ii) exercising calibration modes on the wireless rotating instrumentation package 116/118/120/122; iii) checking data on the wireless rotating instrumentation package 116/118/120/122 before flight; and iv) re-programming the wireless rotating instrumentation package 116/118/120/122.

In still another embodiment of the wireless rotating instrumentation package 116/118/120/122, the instrumentation package 116/118/120/122 further comprises a Built In Test (BIT) 170 connected by wire to the data modules 116 which tests battery voltage, temperature and acceleration in the wireless rotating instrumentation package 116/118/120/122.

In yet another embodiment of the wireless rotating instrumentation package 116/118/120/122, the instrumentation package 116/118/120/122 further comprises production power slip-rings to connect with the wireless rotating instrumentation package 116/118/120/122 to provide electricity to heat, de-ice or power the wireless rotating instrumentation package 116/118/120/122 during flight.

In still another embodiment of the wireless rotating instrumentation package 116/118/120/122, the instrumentation package 116/118/120/122 further comprises one or more additional telemetry transmitter transmit antennas 132 and one or more additional airborne telemetry receiver receive antennas 136 to maintain a line of site link during rotation of the rotor head.

In yet another embodiment of the wireless rotating instrumentation package 116/118/120/122, the telemetry transmitter transmit antennas 130, 132 and airborne telemetry receiver receive antennas 134,136 are polarized and orientated to establish a favorable RF link through the full rotation of the rotor head 110.

In still another embodiment of the wireless rotating instrumentation package 116/118/120/122 including a transmission signal splitter 128, the lengths of RF transmit cable 138,182 are varied to change the signal phasing at the transmission signal splitter 128 so that cancellation can be controlled as a function of rotation angles.

In yet another embodiment of the wireless rotating instrumentation package 116/118/120/122 including a receiver signal combiner 140, the lengths of RF transmit cable 138,182 and RF receive cable 178, 184 are varied to change the signal phasing at the receiver signal combiner 140 so that cancellation can be controlled as a function of rotation angles.

In still another embodiment of the wireless rotating instrumentation package 116/118/120/122, ratios of the relative amplitude of the signals in the transmission signal splitter 128 and/or in the receiver signal combiner 140 can be varied to control cancellations of the signal as a function of rotator angles.

In yet another embodiment of the wireless rotating instrumentation package 116/118/120/122, RF transmit power can be varied to get an adequate signal to noise ratio and adequate BER.

The present application also relates to a method of wirelessly collecting data from a spinning rotor head 110 of a rotary wing aircraft. The method comprises the steps of:

A) attaching a wireless rotating instrumentation package 116/118/120/122 to a rotor 110 of a rotary wing aircraft, the instrumentation package 116/118/120/122 comprising:

i) data modules 116;

ii) a small data collection system 118 including a GPS time card (not shown) to provide time tags for data collection; and iii) an instrumentation package solid state data recorder 120 with removable solid state media (not shown) for collecting lossless data with micro-second GPS derived time tags (not shown);

B) adding additional devices connected by wire to the attached instrumentation package 116/118/120/122 to aid in operation of the instrumentation package 116/118/120/122, the additional devices including:

i) rotor data transducers 114 on the rotor head 110 and rotor blades 112;

ii) battery or batteries 122;

iii) a data modules GPS antenna 166 enabled to send GPS signals by wire to the data modules 116;

iv) a digital L-Band telemetry transmitter 126 using PCM/FM modulation to receive Pulse Coded Modulation (PCM) output from the data collection system 118; and v) at least one telemetry transmitter transmit antenna 130,132, being connected to receive a signal from the digital L-Band telemetry transmitter 126;

C) sending data wirelessly from the wireless rotating instrumentation package 116/118/120/122 to an aircraft data collection system 146 via antennas, the aircraft data collection system 146 including i) at least one airborne telemetry receiver receive antenna 134,136 placed in line of site with the telemetry transmitter transmit antenna(s) 130,132 and being connected to send a signal to an airborne telemetry receiver 142;

ii) the airborne telemetry receiver 142 being enabled to be fed the signal received by the at least one airborne telemetry receiver receive antenna 134,136 the airborne telemetry receiver 142 including a bit synchronizer (not shown);

iii) a decommutator card (not shown) included in a main aircraft data collection system 146, the decommutator card (not shown) being enabled to receive data from the bit synchronizer (not shown) of the airborne telemetry receiver 142, and the decommutator card (not shown) then being enabled to direct decommutated data to the main aircraft data collection system 146;

iv) an aircraft data collection system solid state recorder 152 in which combined composite data from the aircraft data collection system 146 is recorded with a GPS time stamp (not shown) for post flight data processing;

v) a solid state recorder GPS antenna 172 connected by wire to the aircraft data collection system solid state recorder 152, data being able to be sent by the solid state recorder GPS antenna 172 from the aircraft data collection system solid state recorder 152;

vi) an aircraft data collection system telemetry transmitter 148 to which the combined composite data is directed and telemetered;

vii) an aircraft data collection system transmit antenna 150 connected by wire with the aircraft data collection system telemetry transmitter 148 by which data can be sent from the aircraft data collection system telemetry transmitter 148 to a ground station tracking antenna 154;

viii) an aircraft data collection system GPS antenna 168 connected by wire to the aircraft data collection system 146 and being enabled to receive data for the aircraft data collection system 146.

ix) the ground station tracking antenna 154 connected by wire to a ground station 156, the ground station tracking antenna 154 being enabled to receive data from the aircraft data collection system transmit antenna 150 which is in direct communication with the aircraft data collection system telemetry transmitter 148;

x) the ground station 156 which analyzes the data received to maintain safety-of-flight and to make flight test decisions.

In another embodiment of the method, when multiple telemetry transmitter transmit antennas 130,132 are used then a transmission signal splitter 128 is connected by wire to the digital L-Band telemetry transmitter 126 and the multiple telemetry transmitter transmit antennas 130, 132 are in turn connected by wire to the transmission signal splitter 128.

In yet another embodiment of the method, when multiple airborne telemetry receiver receive antennas 134,136 are used then a receiver signal combiner 140 is connected by wire to the airborne telemetry receiver 142 and the multiple airborne telemetry receiver receive antennas 134,136 are in turn connected by wire to the receiver signal combiner 140.

In still another embodiment of the method, the small data collection system 118 includes a ground maintenance-providing bi-directional RF data link 164 connected by wire to the small data collection system 118; the ground maintenance-providing bi-directional RF data link 164 including a maintenance link transmit antenna 162; wherein the maintenance link transmit antenna 162 in turn transmits data to the aircraft data collection system GPS antenna 168 which is connected by wire to the aircraft data collection system 146.

In yet another embodiment of the method, the maintenance link transmit antenna 162 transmits data wirelessly between the ground maintenance-providing bi-directional RF data link 164 and a maintenance computer antenna 160 included on a maintenance computer 158, the maintenance computer 158 in turn controls i) turning the wireless rotating instrumentation package 116/118/120/122 on or off; ii) exercising calibration modes on the wireless rotating instrumentation package 116/118/120/122; iii) checking data on the wireless rotating instrumentation package 116/118/120/122 before flight; and iv) re-programming the wireless rotating instrumentation package 116/118/120/122.

EXAMPLE

The technical specifications listed here are for an embodiment, successfully flown for a flight test. They are but one realization of a viable system for a specific helicopter application. The components listed can be configured, programmed or substituted for a specific air vehicle or program requirement. For instance, the data acquisition system stack may contain more or less cards and thus more or less data channels. Another vendor's miniature PCM system may be used, assuming it withstands the rotating environment, vibration, centrifugal forces, temperature, etc. The bit rate and data cycle map can be programmed to accommodate different sample rates for different rotational speeds and data requirements for specific testing. The battery 122 size can be tailored to the aircraft application for power and run time. Component numbering below refers to a specific embodiment of the instrumentation package 116/118/120/122 including the components shown in FIG. 1. The components include:

(1.) Transducers (114)—Various; Strain Gages, position transducers (114);

(2.) Small Data Collection System (118)—Teletronics Technology Corp (TTC) Mini-DAU 2000 (WDAU):

a. MWCI-105-2 Overhead Module: Programmable, (Approximately) 2 Mbit/sec PCM stream, (Approximately) 1800 samples per second, (Approximately) one sample per parameter per degree of rotor revolution;

b. MGPS-101A, GPS time receiver, time tagging to the micro-second;

c. Power modules, MPFM-461, MPSM-2012-1, MPSM-2515-4, End Plate;

(3.) Data Modules (116) for PCM system:

a. 4 each, 8 channel MSCD-108D module, 32 channel analog input;

i. Voltage excitation with programmable gain and offset;

ii. 16 bit resolution Analog to Digital Converter (ADC) per channel;
iii. Programmable digital pre-sample filtering;
b. 1 each, 4 channel MSCD-604D-1, 4 channel analog w/constant current excitation;
(4.) Solid State Recorder (152)—TTC SSR-IOOC:
a. File based .bin format, Software conversion to IRIG106—Chapter 10 format;
b. 2 each, 2 Gbyte compact flash card media;
c. 4 Hr record time (approximately);
(5.) Battery (122)—LiFePO$_4$—Lithium Iron Phosphate:
a. 2 each, (batteryspace.com) Custom LFP 266SO, 12.8V, 6.6 Ah in series for 2S.6 Vdc; In-house packaging design and fabrication, connections to re-charge separately, 3+ Hr battery life, standard recharge 3 hrs, quick charge 1½ hrs.;
b. Option to remove and replace battery module in instrumentation package 116/118/120/122;
(6.) Power Scavenging (124)—Not implemented in this instrumentation package 116/118/120/122;
(7.) TM Transmitter (126)—Quasonix, Digital, L-band, QSX-VLR-110-10S-20-4D-DP:
a. Variable Power—10 mW to 10 W, Set to 100 mW, PCM/FM mode;
(8.) Power Divider (128)—Haigh-Farr 2-way L-band power divider P/N 2169 SO/SO;
(9.) Transmit Antenna (130)—Lower L-band Omni-directional:
a. AFTD In-house, Tuned for lower L-band, SMA connector;
b. Mounted to side of instrumentation package (116/118/120/122) in radial/horizontal orientation between blades;
(10.) Transmit Antenna (132)—Lower L-band Omni-directional;
a. AFTD In-house, Tuned for lower L-band, SMA connector
b. Mounted to side of rotor instrumentation package (116/118/120/122) in radial/horizontal orientation between blades (112) 180 degrees across rotor head (110) from #9 (transmit antenna 130);
(11.) Receive Antenna (134)—Haigh-Farr BNI-13100 Broadband (L&S) Omni-directional;
(12.) Second antenna (136) not used in this application;
(13.) Tuned cable lengths (138,182) (178,184)—2 equal lengths for Transmit (138,182), Single Receiver (178,184) cable;
(14.) Combiner (140) not used in this application;
(15.) Airborne Receiver (142)—Quasonix QSX-RDMS-L-1100-AB-RS:
a. L-band RF input, Bit Sync output, PCM RS-422 Data and Clock output;
(16.) Data Merger (144)—TTC DCM-101 Decom/Merger card for main aircraft instrumentation system;
(17.) Aircraft Instrumentation System (146)—Army/TTC CDAU 2016 based system;
(18.) Telemetry Transmitter (148)—Quasonix, Digital, L-band, QSX-VLR-110-10S-20-4D-DP:
a. Variable Power 10 mW to 10 W, Set to 10 W, PCM/FM mode;
(19.) Transmit Antenna (150)—Haigh-Farr, Lower L-band Blade Antenna;
(20.) Solid State Recorder (152)—TTC SSR-100L in CDAU housing and/or Heim Miniature Data Recorder (MDR) IRIG Chapter 10;
(21.) Tracking Antenna (154) TCS-1800;
(22.) Ground Station (156)—Army RTC Ground Station;
23. Not Implemented in first unit;
24. Not Implemented in first unit;
25. Not Implemented in first unit;
26. Not Implemented in first unit;
(27.) GPS Antenna (166)—TTC ANT-00733S-1;
(28.) GPS Antenna (168)—TTC ANT-00733S-1;
(29.) Built In Test (BIT) Data (170)—Battery Voltage & Temperature, Accelerometers;
(30.) GPS Antenna (172)—TTC ANT-00733S-1.

While embodiments have been described in detail, it will be apparent to those skilled in the art that the disclosed embodiments may be modified. Therefore, the foregoing description is to be considered exemplary rather than limiting.

What is claimed is:

1. A wireless rotating instrumentation package for collecting data from a spinning rotor head of a rotary wing aircraft, the data being used for both real time flight testing and post flight processing, the rotor instrumentation package attached to a rotor of a rotary wing aircraft, the rotor being positioned on top of the aircraft airframe, the rotor instrumentation package comprising:
a) data modules;
b) a small data collection system including a global positioning system (GPS) time card to provide time tags for data collection; and
c) an instrumentation package solid state data recorder with removable solid state media for collecting lossless data with micro-second GPS derived time tags;
and wherein wired devices communicating by wire to the rotor instrumentation package, the wired devices including:
a) rotor data transducers on the rotor head and rotor blades;
b) battery or batteries;
c) at least one data modules GPS antenna enabled to send GPS signals by wire to the data modules in the rotor instrumentation package on the rotor, the data modules GPS antenna wirelessly sending signals to at least two GPS antennas/receivers connected to an aircraft data collection system on a floor surface inside the airframe;
d) a digital L-Band telemetry transmitter using pulse code modulation/frequency modulation (PCM/FM) modulation to receive Pulse Coded Modulation (PCM) output from the data collection system; and
e) at least one telemetry transmitter transmit antenna, being connected by wire to receive a signal from the digital L-Band telemetry transmitter;
and wherein the rotor instrumentation package being enabled to communicate wirelessly with the aircraft data collection system on the floor surface inside the aircraft, by a wireless signal being sent via the at least one telemetry transmitter transmit antenna connected by wire to receive a signal from the digital L Band telemetry transmitter which is in turn wired to the rotor instrumentation package, the aircraft data collection system including:
a) at least one airborne telemetry receiver receive antenna being positioned in line of site to communicate wirelessly with the telemetry transmitter transmit antenna(s), and being connected by wire to send a signal to the airborne telemetry receiver;
b) the airborne telemetry receiver being enabled to be fed the signal received by the at least one airborne telemetry receiver receive antenna, the airborne telemetry receiver including a bit synchronizer;

c) a decommutator card included in a main aircraft data collection system, the decommutator card being enabled to receive data from the bit synchronizer of the airborne telemetry receiver, and the decommutator card then being enabled to direct decommutated data to the main aircraft data collection system;

d) an aircraft data collection system solid state recorder in which combined composite data from the aircraft data collection system is recorded with a GPS time stamp for post flight data processing;

e) a solid state recorder GPS antenna connected by wire to the aircraft data collection system solid state recorder, to send GPS data from the solid state recorder GPS antenna to the aircraft data collection system solid state recorder;

f) an aircraft data collection system telemetry transmitter to which the combined composite data is directed and telemetered;

g) a telemetry transmitter transmit antenna connected by wire with the aircraft data collection system telemetry transmitter by which data can be sent from the aircraft data collection system telemetry transmitter to a ground station tracking antenna;

h) an aircraft data collection system GPS antenna connected by wire to the aircraft data collection system and being enabled to receive GPS data for the aircraft data collection system and i) the ground station tracking antenna connected by wire to a ground station, the ground station tracking antenna being enabled to receive data from the aircraft data collection system transmit antenna which is in direct communication with the aircraft data collection system telemetry transmitter; and j) the ground station which analyzes the data received to maintain safety-of-flight and to make flight test decisions.

2. The wireless rotating instrumentation package of claim 1, wherein when multiple telemetry transmitter transmit antennas are used then a transmission signal splitter is connected by wire to the digital L-Band telemetry transmitter and the multiple telemetry transmitter transmit antennas are in turn connected by wire to the transmission signal splitter.

3. The wireless rotating instrumentation package of claim 1, wherein when multiple airborne telemetry receiver receive antennas are used then a receiver signal combiner is connected by wire to the airborne receiver, and the multiple airborne telemetry receiver receive antennas are in turn connected by wire to the receiver signal combiner.

4. The wireless rotating instrumentation package of claim 1, further comprising a power scavenging unit connected to the rotor head and the battery, and the power scavenging unit helps power the battery.

5. The wireless rotating instrumentation package of claim 1, wherein the small data collection system includes a ground maintenance-providing bi-directional RF data link connected by wire to the small data collection system; the ground maintenance-providing a bi-directional RF data link including a maintenance link transmit antenna; wherein the maintenance link transmit antenna in turn transmits data to the aircraft data collection system GPS antenna which is connected by wire to the aircraft data collection system.

6. The wireless rotating instrumentation package of claim 5, wherein the maintenance link transmit antenna transmits data wirelessly between the maintenance link and a maintenance computer antenna included on a maintenance computer, the maintenance computer in turn controls i) turning the wireless rotating instrumentation package on or off; ii) exercising calibration modes on the wireless rotating instrumentation package; iii) checking data on the wireless rotating instrumentation package before flight; and iv) re-programming the wireless rotating instrumentation package.

7. The wireless rotating instrumentation package of claim 1, further comprising a Built In Test (BIT) connected by wire to the data modules which tests battery voltage, temperature and acceleration in the wireless rotating instrumentation package.

8. The wireless rotating instrumentation package of claim 1, further comprising production power slip-rings to connect with the wireless rotating instrumentation package to provide electricity to heat, de-ice or power the wireless rotating instrumentation package during flight.

9. The wireless rotating instrumentation package of claim 1, further comprising one or more additional telemetry transmitter transmit antennas and one or more additional airborne telemetry receiver receive antennas to maintain a line of site link during rotation of the rotor head.

10. The wireless rotating instrumentation package of claim 1, wherein the telemetry transmitter transmit antennas and airborne telemetry receiver receive antennas are polarized and orientated to establish a favorable RF link through the full rotation of the rotor head.

11. The wireless rotating instrumentation package of claim 2, wherein the lengths of RF cable are varied to change the signal phasing at the transmission signal splitter so that cancellation can be controlled as a function of rotation angles.

12. The wireless rotating instrumentation package of claim 3, wherein the lengths of RF cable are varied to change the signal phasing at the receiver signal combiner so that cancellation can be controlled as a function of rotation angles.

13. The wireless rotating instrumentation package of claim 1, wherein ratios of the relative amplitude of the signals in the transmission signal splitter and/or in the receiver signal combiner can be varied to control cancellations of the signal as a function of rotator angles.

14. The wireless rotating instrumentation package of claim 1, wherein RF transmit power can be varied to get an adequate signal to noise ratio and adequate BER.

15. A method of wirelessly collecting data from a spinning rotor head of a rotary wing aircraft, comprising the steps of:

A) attaching a wireless rotating instrumentation package to a rotor of a rotary wing aircraft, the rotor being positioned on top of the aircraft body, the package comprising:
  i) data modules;
  ii) a small data collection system including a GPS time card to provide time tags for data collection; and
  iii) a rotor instrumentation package solid state data recorder with removable solid state media for collecting lossless data with micro-second GPS derived time tags;

B) adding additional devices connected by wire to the attached rotor instrumentation package to aid in operation of the rotor instrumentation package, the additional devices including:
  i) rotor data transducers on the rotor head and rotor blades;
  ii) battery or batteries;
  iii) a GPS antenna enabled to send GPS signals by wire to the data modules in the rotor instrumentation package on the rotor, the data modules GPS antenna wirelessly sending signals to at least two GPS antennas/receivers connected to an aircraft data collection system on a floor surface inside the airframe body;

iv) a digital L-Band telemetry transmitter using PCM/FM modulation to receive Pulse Coded Modulation (PCM) output from the data collection system; and v) at least one telemetry transmitter transmit antenna, being connected to receive a signal from the digital L-Band telemetry transmitter;

C) sending data wirelessly from the wireless rotating instrumentation package to an aircraft data collection system via antennas, the aircraft data collection system being on a floor surface inside the airframe and including i) at least one airborne telemetry receiver receive antenna placed in line of site to communicate wirelessly with the telemetry transmitter transmit antenna(s), and being connected by wire to send a signal to an airborne telemetry receiver;

ii) the airborne telemetry receiver being enabled to be fed the signal received by the at least one airborne telemetry receiver receive antenna, the airborne telemetry receiver including a bit synchronizer;

iii) a decommutator card included in a main aircraft data collection system, the decommutator card being enabled to receive data from the bit synchronizer of the airborne telemetry receiver, and the decommutator card then being enabled to direct decommutated data to the main aircraft data collection system;

iv) an aircraft data collection system solid state recorder in which combined composite data from the aircraft data collection system is recorded with a GPS time stamp for post flight data processing;

v) a solid state recorder GPS antenna connected by wire to the aircraft data collection system solid state recorder, data being able to be sent by the solid state recorder GPS antenna from the aircraft data collection system solid state recorder;

vi) an aircraft data collection system telemetry transmitter to which the combined composite data is directed and telemetered;

vii) a telemetry transmitter transmit antenna connected by wire with the aircraft data collection system telemetry transmitter by which data can be sent from the aircraft data collection system telemetry transmitter to a ground station tracking antenna;

viii) an aircraft data collection system GPS antenna connected by wire to the aircraft data collection system and being enabled to receive data for the aircraft data collection system;

ix) the ground station tracking antenna connected by wire to a ground station, the ground station tracking antenna being enabled to receive data from the aircraft data collection system antenna which is in direct communication with the aircraft data collection system telemetry transmitter;

x) the ground station which analyzes the data received to maintain safety-of-flight and to make flight test decisions.

16. The method of claim 15, wherein when multiple telemetry transmitter transmit antennas are used then a transmission signal splitter is connected by wire to the digital L-Band telemetry transmitter and the multiple telemetry transmitter transmit antennas are in turn connected by wire to the transmission signal splitter.

17. The method of claim 1, wherein when multiple airborne telemetry receiver receive antennas are used then a receiver signal combiner is connected by wire to the airborne telemetry receiver, and the multiple airborne telemetry receiver receive antennas are in turn connected by wire to the receiver signal combiner.

18. The method of claim 15, wherein the small data collection system includes a ground maintenance-providing bi-directional RF data link connected by wire to the small data collection system; the ground maintenance-providing bi-directional RF data link including a maintenance link transmit antenna; wherein the maintenance link transmit antenna in turn transmits data to the aircraft data collection system GPS antenna which is connected by wire to the aircraft data collection system.

19. The method of claim 15, wherein the maintenance link transmit antenna transmits data wirelessly between the ground maintenance-providing bi-directional FR data link and a maintenance computer antenna included on a maintenance computer, the maintenance computer in turn controls i) turning the wireless rotating instrumentation package on or off; ii) exercising calibration modes on the wireless rotating instrumentation package; iii) checking data on the wireless rotating instrumentation package before flight; and iv) re-programming the wireless rotating instrumentation package.

* * * * *